Figure 1:
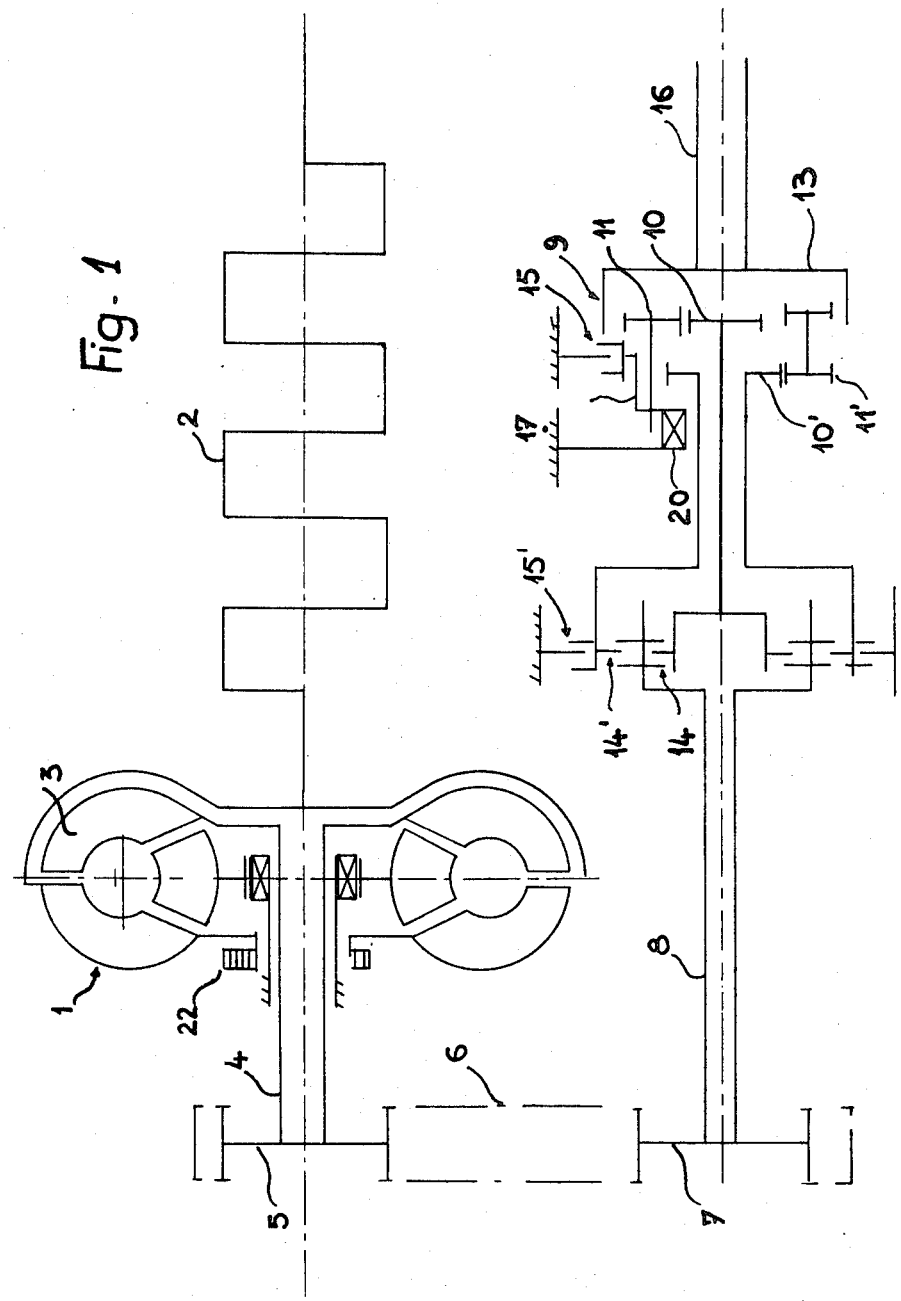

United States Patent [19]
Piret

[11] 3,710,650
[45] Jan. 16, 1973

[54] PLANETARY GEAR-CHANGE-SPEED TRANSMISSION MECHANISMS

[75] Inventor: Jean Piret, Billancourt, France

[73] Assignees: Regie Nationale Des Usines Renault, Billancourt; Automobiles Peugeot, Paris, France

[22] Filed: Feb. 1, 1971

[21] Appl. No.: 111,225

[30] Foreign Application Priority Data

Feb. 4, 1970 France..............................7003902

[52] U.S. Cl..................................74/763, 192/87.11
[51] Int. Cl........................F16h 57/10, F16d 25/08
[58] Field of Search....................74/763; 192/87.11

[56] References Cited

UNITED STATES PATENTS

| | | | |
|---|---|---|---|
| 3,279,573 | 10/1966 | Hensel | 192/87.11 |
| 3,287,995 | 11/1966 | Leonard et al. | 74/763 |
| 3,446,095 | 5/1969 | Bookout | 74/763 |
| 3,494,223 | 2/1970 | Mori | 74/763 X |

*Primary Examiner*—Arthur T. McKeon
*Attorney*—Stevens, Davis, Miller & Mosher

[57] ABSTRACT

Planetary-gear train transmission mechanism for automotive vehicles; this mechanism comprises a casing enclosing devices controlled hydraulically by piston means, a bearing in said casing, and a pair of annular fluid-receiving chambers adapted to be fed separately with hydraulic control fluid under pressure, the outer diameter of said chambers being substantially equal to the outer diameter of the locking devices of the planet-gear carrier and sun gear of the planetary-gear train, and the walls of said chambers constituting said bearing.

8 Claims, 4 Drawing Figures

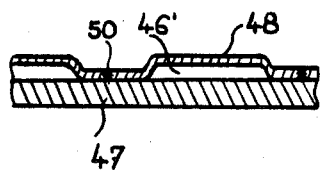
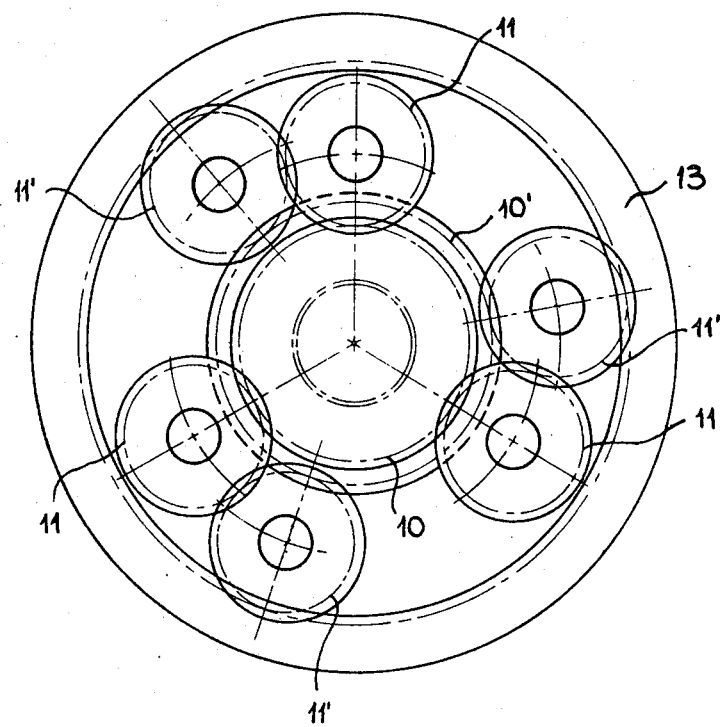

PLANETARY GEAR-CHANGE-SPEED TRANSMISSION MECHANISMS

This invention relates to mechanisms of the type designed for providing predetermined ratios between the rotational speeds of the input and output shafts of a planetary or epicyclic change-gear transmission. The momentary gear ratio is selected among the series of gear ratios available through the use of a planetary-gear set or train in which, by properly controlling adequate hydraulic coupling means, it is possible to determine either the rotational driving engagement of two component elements or cause these elements to become rigid with the casing enclosing the mechanism. Mechanisms of this character are referred to more generally as hydraulic-controlled planetary- or epicyclic-gear trains.

In known mechanisms of this type the following main elements are usually incorporated:
- the planetary or epicyclic gear train proper, comprising a number of elements necessary for determining the desired range of rotational speed ratios,
- the input shaft of the mechanism,
- the output shaft of the mechanism,
- one or a plurality of multiple-disk, hydraulicly-controlled clutches providing the coupling of the different elements of the epicyclic train with the input shaft of the mechanism,
- one or a plurality of multiple-disks brakes, also hydraulically controlled, adapted to lock against rotation one or a plurality of elements of the planetary-gear train by momentarily locking them in relation to the stationary casing,
- one or a plurality of free-wheels associated with certain elements of the planetary-gear train,
- a rigid casing adapted to support the static and dynamic reactions of the complete mechanism and to center the subassemblies of the mechanism.

Hydraulicly-controlled planetary-gear trains afford an advantageous construction of automatic change-speed transmissions of motor vehicles through hydraulic control systems responsive to the engine speed and load, to the vehicle speed and to the driver's control action.

Automatic change-speed mechanism are currently provided with a central bearing connected with the casing of the mechanism. Now this bearing supports the planet-gear carrier of the epicyclic train and transmits the fluid under pressure to one or a plurality of rotating brakes and clutches. This central bearing is also used for absorbing the reaction of the torque transmitted through the free-wheel and, in certain cases, for lubricating various component elements of the mechanism.

In frequent instances these bearings have relatively large over-all dimensions in relation to the permissible maximum torque. These over-all dimensions are also subordinate to the arrangement of the inlet and delivery pipes and ducts for the oil under pressure.

In order to reduce the longitudinal dimensions and the weight of the central bearing, and consequently those of the transmission mechanism, it is now current practice to use radial ducts or passages for supplying the fluid under pressure to the members to be controlled. However, it was observed that this procedure is objectionable on account of the resulting relative arrangement of the hydraulic members controlling the brakes and clutches. In order to separate the lubrication circuits from the brake and clutch control cylinders or actuators, it was proposed to provide fluid cylinders or chambers somewhat shifted in relation to the bearing body.

It is for this specific reason that known design of hydraulically controlled planetary-gear trains are provided with control cylinders disposed externally of the central bearing.

In order to reduce the axial dimensions of the mechanism it has already been proposed to reduce the number of clutch disks. However, in known constructions of this character it is observed that disks having relatively large friction surface areas cannot be used for they tend to increase the over-all dimensions of the mechanism. Since it is not possible to increase abnormally the external dimensions of gear casings, manufacturers have been led in many instances to adopt compromises in which one or a plurality of the requisite properties of these mechanisms are sacrificed.

It is a primary object of the present invention to provide a mechanism of relatively reduced over-all dimensions for hydraulically controlling a planetary gear train.

It is another object of this invention to provide a specific arrangement of the fluid chamber of the hydraulic cylinder and piston actuators without unduly increasing the axial or radial dimensions of the mechanism.

Furthermore, a specific object of this invention consists of avoiding the inconveniences set forth hereinabove by utilizing a reduced number of friction disks of same external diameter, with a maximum operative surface of the friction lining carried thereby for transmitting the reverse-gear reaction torque.

Figure 2:
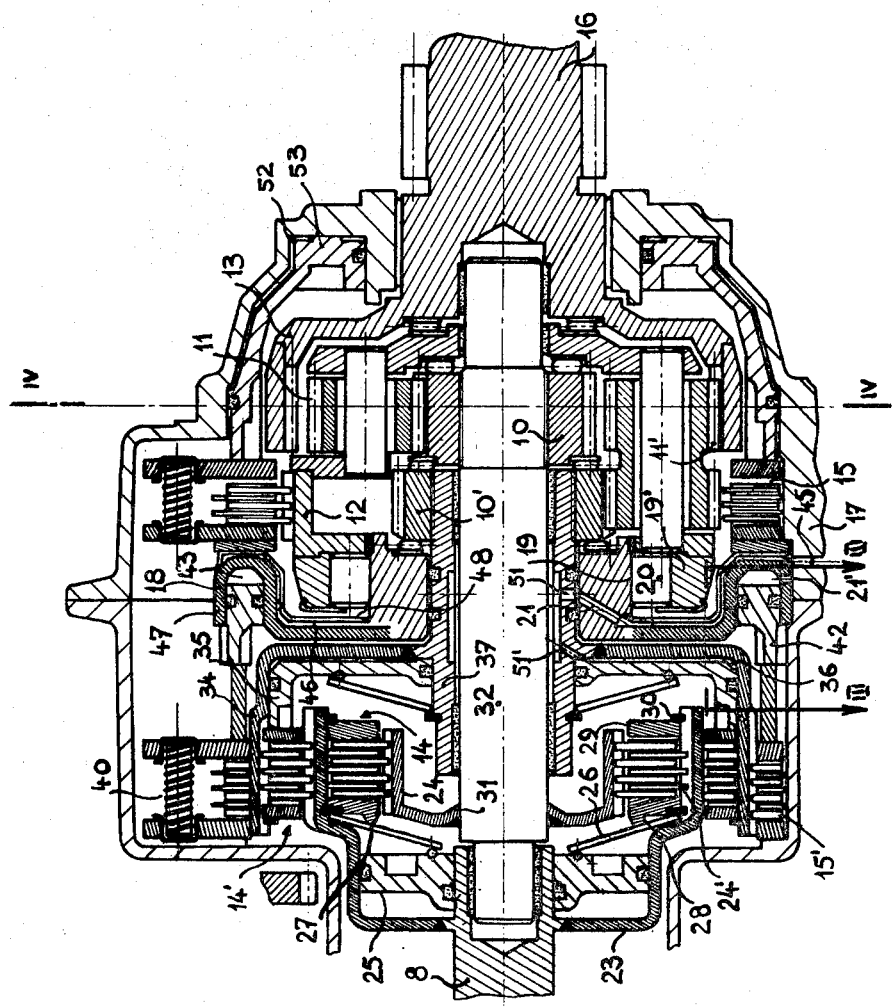

Other objects and advantages of this invention will appear as the following description proceeds with reference to the attached drawings illustrating diagrammatically by way of example a preferred form of embodiment to which various modifications may be brought without departing from the spirit and scope of the invention. In the drawings:

FIG. 1 is a diagrammatic illustration of the general arrangement of the transmission mechanism according to this invention, FIG. 2 is a longitudinal section showing the hydraulically controlled planetary or epicyclic gear train, FIG. 3 is a section taken along the line III—III of FIG. 2 showing a detail of a specific form of embodiment, and FIG. 4 is a diagrammatical cross-sectional view of the planetary or epicyclic gear train, the section being taken along the line IV—IV of FIG. 2.

Referring first to FIG. 1, the hydro-kinetic torque converter 1 is mounted to the output end of a crankshaft 2. The output member or turbine 3 of the torque converter is rigid with a shaft 4 supporting a pinion 5. A driving member 6 such as a chain transmits the drive to another pinion 7 mounted to the input shaft 8 of the change-speed mechanism. As shown in FIGS. 1 and 4, the planetary-gear train designated generally by the reference numeral 9 comprises in fact a plurality of elements, i.e., two sun gears 10, 10', two sets of planet gears 11, 11' of different lengths, each rotatably mounted on a planet carrier 12. Furthermore, the planetary or epicyclic gear train comprises an internally toothed annulus 13 meshing with the planet gears 11'.

The clutch devices 14, 14', braking devices 15, 15' and free-wheel 20 are adapted to provide three forward gears and one reverse gear at the rear output shaft 16 of this transmission.

A bearing 18 rigid with the gear casing 17 has a journal 19 for free-wheel 20 and fluid distributing passages 21, 21' fed from an oil pump 22.

The clutch 14 having its pressed-steel bell-shaped member 23 rigid with input shaft 8 comprises a set of disks 24 provided with friction linings and alternating plain disks 24'. These disks are clamped by means of a piston 25 responsive to the fluid pressure. A resilient diaphragm 26 constantly urges the piston 25 to its inoperative or clutch-release position. A bearing point 27 provided on the clamping plate 28 permits increasing the thrust exerted by said piston 25. Another clamping plate 29 abuts against the resilient ring 30 secured within the bell-shaped member 23. The disks 24, 24' are rotatably solid with bell-shaped members 31 and 23, respectively, through suitable splines.

The bell-shaped member 31 is rigidly connected through a shaft 32 to which it is welded to element or sun gear 10 of the planetary train of gears. This sun gear is rotatably driven through splines.

Clutch 14 is thus adapted to couple or uncouple the shaft 8 and sun gear 10.

Similarly, clutch 14' is adapted to couple or uncouple the input shaft 8 to the other sun gear 10' of the planetary gear.

To this end, clutch 14' also comprises two sets of lined and plain disks, respectively, a bell-shaped member 34 and a piston 35 responsive to a hydraulic chamber 36. This bell-shaped member 34 is rigidly connected through a hollow shaft 37 to the sun gear 10' of the planetary-gear train. The locking or braking device 15' is adapted to lock said sun gear 10' in relation to casing 17. The brake 15' comprises a set of disks disposed between a pair of reinforced plates normally urged away from each other by springs 40 and pressed together by means of distance-pieces responsive to a piston 42 of which the annular hydraulic chamber 43 is enclosed in the central bearing 18.

Fluid delivery ducts or passages 21', 45 open into annular chambers 43 and 46 respectively. Chamber 46 is of the constant volume type and bounded axially by the pressed walls 47, 48 of which at least one is rigid with the journal position 19 of free-wheel 20. The outer ring 19' of this free-wheel is welded to the planet-gear carrier 12.

This chamber 43 having an outer diameter substantially equal to that of brake 15 or 15' encloses the piston 42 controlling the brake 15'.

In the form of embodiment illustrated in FIG. 2 the other chamber 46 has the same outer diameter as chamber 43.

FIG. 3 is a detail sectional view showing on a larger scale a typical form of embodiment of chamber 46 of which the wall 48 consists of a piece of pressed sheet metal welded to the wall 47 by means of bosses 50. This procedure avoids the distortion of the relatively thin wall 48 as a consequence of the fluid pressure and at the same time provides a chamber 46' in the form of an oil passage.

The locking or braking devices 15, 15' are comprised of two sets of disks rigid with the planet-gear carriers 12, and sun gear 10' and casing 17 respectively.

Ducts 51, 51' formed in said hollow shaft 37 provide a fluid communication between chamber 46 and chamber 36 of which one fraction of the surface consists of the end face of piston 35. It will be seen that this piston 35 moves in direction opposite to that of piston 25 and that these pistons are disposed on either side of the assembly comprising the clutches 14, 14' and brake 15'. This assembly is disposed substantially at the level of a same transverse plane, perpendicularly to the longitudinal axis of the transmission mechanism.

The two sets of brake disks 15, 15' have substantially the same outer diameter and the reverse-gear brake disks 15 are rigid with the planet-gear carrier 12. In order to have a maximum lining working surface while using a reduced number of disks, the arrangement according to the present invention comprises disks wherein the inner diameter of the linings is equal to the diameter of the circumference enveloping the planet-gears 11' meshing with the internally toothed annulus 13 of the planetary gear. The working surface of these linings will thus be consistent with the relatively high reaction torque developed in reverse gear.

To increase the surface area of chamber 52 receiving the control piston of brake 15, the disks associated with this brake are disposed between the internally toothed annulus 13 of the planetary gear and the lateral surface of bearing 18. With this arrangement a bell-shaped piston 53 movable in the casing 17 may advantageously be obtained. Under these conditions it is possible to lodge the planetary gear element having the greatest diameter, i.e., annulus 13, into the hollowed portion of the piston.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new is::

1. A planetary-gear transmission mechanism, comprising:
   a casing;
   a planetary gear train mounted within said casing;
   brake and clutch means mounted within said casing coaxially to said planetary gear train, said brake and clutch means including hydraulic pistons for locking and engaging elements of the planetary gear train;
   an annular bearing member connected to said casing and having a bearing surface on the radially exterior surface of the inner portion of its surface, said bearing surface being coaxial to the gear train and brake and clutch means;
   free-wheeling journal bearing means in contact with said bearing surface;
   duct means for distributing fluid under pressure to said brake and clutch means;

said mechanism further comprising first and second fluid chambers associated with said annular bearing member, the outer diameter of said chambers being substantially equal to the outer diameter of the brake means, said first chamber bounded by a portion of said annular bearing member and a brake piston associated with said portion of said annular bearing member, and said second chamber having a constant volume bounded at least in part by a sheet metal member bonded to one side of said annular bearing member, said sheet metal member having bosses therein forming a fluid lubricating passage.

2. Planetary-gear transmission mechanism according to claim 1, characterized in that at least one of the walls of said constant-volume chamber is rigid with the insert journal portion of the free-wheel of which the outer race is welded to the planet-gear carrier of the planetary-gear train.

3. Planetary-gear transmission mechanism according to claim 1, characterized in that the constant-volume chamber of said bearing connected to the casing of the mechanism opens into another chamber of which one fraction of the surface is bounded by the face of the piston controlling a clutch device.

4. Planetary-gear transmission mechanism according to claim 1, characterized in that the brake means comprises two sets of disks, one set being connected to the planet-gear carriers and sun gear of the planetary gear and the other with the casing, respectively, one set of brake means being disposed on each side of the annular bearing connected to the casing of the mechanism.

5. Planetary-gear transmission mechanism according to claim 4, characterized in that said two sets of disks of said brake means have substantially the same outer diameter, and that the inner diameter of the lining provided on the disks rigid with the planet-gear carrier is substantially equal to the diameter of the circumference enveloping the planet gears which mesh with an internally toothed annulus of an planetary gear train.

6. Planetary-gear transmission mechanism according to claim 5, characterized in that one set of disks of said brake means is positioned between said internally toothed annulus of the planetary gear train having the greatest diameter and the annular lateral face of the bearing connected with said casing.

7. Planetary-gear transmission mechanism according to claim 1, characterized in that said clutch means are disposed substantially in the same transverse plane containing the brake means of a sun gear of the planetary-gear train, and that said clutch means are controlled by means of pistons operating in opposite directions and disposed on either side of said clutch devices.

8. Planetary-gear transmission mechanism according to claim 7, characterized in that the control piston of one of the brake means is substantially bell-shaped with its hollowed portion partially occupied by an internally toothed annulus of the planetary-gear train.

* * * * *